United States Patent

O'Donnell et al.

[11] Patent Number: 6,054,529
[45] Date of Patent: Apr. 25, 2000

[54] BLENDS OF AND METHODS OF BLENDING EVOH POLYMERS AND ETHYLENE BASED POLYMERS HAVING IMPROVED ENVIRONMENTAL STRESS CRACKING OR ENVIRONMENTAL FATIGUE RESISTANCE, AND PRODUCTS THEREFROM

[75] Inventors: Hugh J. O'Donnell, Cincinnati; Andrew J. Wnuk, Wyoming, both of Ohio

[73] Assignee: The Procter & Gamble Co., Cincinnati, Ohio

[21] Appl. No.: 08/835,537

[22] Filed: Apr. 8, 1997

[51] Int. Cl.[7] ............................. F16J 3/04; C08L 23/08; C08L 31/04; C08L 29/04
[52] U.S. Cl. .................. 525/57; 92/47; 92/34; 428/36.6; 2/16
[58] Field of Search ............... 525/57; 92/34, 92/47; 428/36.6; 2/16

[56] References Cited

U.S. PATENT DOCUMENTS

| | | |
|---|---|---|
| 2,200,429 | 5/1940 | Perrin et al. . |
| 3,261,889 | 7/1966 | van't Wout . |
| 3,382,298 | 5/1968 | Larsen et al. . |
| 3,410,928 | 11/1968 | Baum . |
| 3,485,783 | 12/1969 | Kehe . |
| 3,533,976 | 10/1970 | Eldman . |
| 3,663,663 | 5/1972 | Bernie et al. . |
| 3,770,852 | 11/1973 | Hager et al. . |
| 3,808,047 | 4/1974 | McAda ........................ 117/232 |
| 3,988,509 | 10/1976 | Ballard et al. ................ 528/491 |
| 4,003,963 | 1/1977 | Creasy et al. . |
| 4,293,473 | 10/1981 | Eastman . |
| 4,312,918 | 1/1982 | Bostwick ..................... 428/379 |
| 4,587,295 | 5/1986 | Giles, Jr. et al. ............ 525/57 |
| 4,826,908 | 5/1989 | Cunningham et al. ....... 524/448 |
| 4,866,122 | 9/1989 | Gerlowski et al. .......... 525/58 |
| 4,910,253 | 3/1990 | Lancaster et al. ........... 525/60 |
| 4,965,314 | 10/1990 | Lancaster et al. ........... 525/60 |
| 5,011,720 | 4/1991 | Jabarin ......................... 428/36.6 |
| 5,069,946 | 12/1991 | Moritani et al. ............. 428/36.6 |
| 5,175,054 | 12/1992 | Chu .............................. 428/461 |

FOREIGN PATENT DOCUMENTS

| | | |
|---|---|---|
| 177762 A2 | 4/1986 | European Pat. Off. . |
| 483695 A2 | 5/1992 | European Pat. Off. . |
| 759359 A1 | 2/1997 | European Pat. Off. . |

*Primary Examiner*—Mark L. Warzel
*Attorney, Agent, or Firm*—Gilbreth & Associates, P.C.; J. M. (Mark) Gilbreth

[57] ABSTRACT

A blend composition having improved environmental stress cracking resistance or environmental fatigue resistance, including an ethylene vinyl alcohol polymer and a polymer of ethylene with at least one selected from the group consisting of alpha olefin having at least 2 carbon atoms, and an ethylenically unsaturated carboxylic ester monomer. Flexible products may be made from the blend by heating the blend above its melting point, forming the melted blend into a desired shape, and then cooling the shape below its melting point.

2 Claims, 1 Drawing Sheet

BLENDS OF AND METHODS OF BLENDING EVOH POLYMERS AND ETHYLENE BASED POLYMERS HAVING IMPROVED ENVIRONMENTAL STRESS CRACKING OR ENVIRONMENTAL FATIGUE RESISTANCE, AND PRODUCTS THEREFROM

BACKGROUND OF THE INVENTION

1. Field of the Invention

The present invention relates to polymer blends, useful in an aggressive chemical environment, to methods of making such blends, and to articles made thereof. In another aspect, the present invention relates to polymer blends with improved environmental stress crack resistance, to methods of making such blends, and to articles made thereof. In even another aspect, the present invention relates to polymer blends with improved environmental fatigue resistance, to methods of making such blends, and to articles made thereof. In still another aspect, the present invention relates to polymer blends of ethylene vinyl alcohol polymers and ethylene based polymers, to methods of making such blends, and to articles made thereof.

2. Description of the Related Art

Many applications require a material which exhibits a resistance to stress cracking and fatigue failure during exposure to an aggressive chemical environment. Stress cracking or environmental stress cracking (ESC) is the brittle failure of plastic parts when simultaneously subjected to static mechanical stress and chemical exposure. In a similar fashion, environmental fatigue (EF) is the failure or cracking of a part when simultaneously subjected to dynamic mechanical stress and chemical exposure. Insufficient environmental stress cracking or environmental fatigue resistance leads to greatly shortened service life of a part.

Ethylene/vinyl acetate copolymers are commonly injection molded into products utilized in applications requiring flexible products having good environmental stress cracking or environmental fatigue resistance.

One common way of obtaining an ethylene/vinyl acetate copolymer with good environmental stress cracking or environmental fatigue resistance is to select a high molecular weight viscous resin especially a resin with a narrow molecular weight distribution. Unfortunately, some processes cannot utilize such a viscous resin. For example, in a process such as injection molding, small intricate mold passages can pose a problem for such a viscous resin. Consequently, this approach of utilizing a high molecular viscous resin is not useful when fabricating a part by injection molding.

There are numerous patents disclosing polymers having improved environmental stress crack resistance.

U.S. Pat. No. 3,261,889, issued Jul. 19, 1966 to van't Wout, discloses a polyethylene-containing material having an increased resistance to environmental stress cracking. The increased resistance is provided by the addition of an atactic copolymer of ethylene with propylene and/or butene-1, and/or by the addition of an atactic copolymer of ethylene with propylene and 1–10% by weight of a diene containing 5–20 carbon atoms.

U.S. Pat. No. 3,382,298, issued May 7, 1968 to Larsen et al., discloses a blend of low density polyethylene and either a polyvinyl ester or polyvinyl acetal. The polyethylenes utilized have a melt index from about 0.01 to about 50 decigrams/minute, and the polyvinyl esters utilized have molecular weight from about 7,000 to 140,000.

U.S. Pat. No. 3,410,928, issued Nov. 12, 1968 to Baum, discloses blends of olefin high polymers and ethylene/acrylic acid copolymers which exhibit greatly improved adhesivity, printability, grease resistance, and stress crack resistance compared with olefin polymers alone. The olefin polymers have a molecular weight of at least 10,000 or a melt index of about 100 or less.

U.S. Pat. No. 3,485,783, issued Dec. 23, 1969, to Kehe, discloses a hot melt adhesive composition that is a blend of an ethylene/alkyl acrylate copolymer, an ethylene/acrylic acid copolymer, and a polymerized rosin ester.

U.S. Pat. No. 3,533,976, issued Oct. 13, 1970, to Eldman, discloses polyolefin blends with superior stress crack resistance comprising polyethylene resin, an ethylene vinyl acetate copolymer, a synthetic paraffin wax, carbon black and an antioxidant. The blend comprises 76 to 92 weight percent polyethylene, and 7 to 15 weight percent ethylene vinyl acetate.

U.S. Pat. No. 3,663,663, issued May 16, 1972 to Bernie et al., discloses polyolefin-ethylene/ester copolymer blend compositions having improved stress cracking properties, especially in the presence of stress crack promoting detergents. The blends comprise a high molecular weight polyethylene having a melt index in the range of about 0.01 to about 10.0, and a copolymer of ethylene and an ester comonomer having a molecular weight below 15,000.

U.S. Pat. No. 3,770,852, issued Nov. 6, 1973 to Hager et al., discloses polyolefin blends having broad polymodal molecular weight distribution and improved environmental stress crack resistance, which are prepared by polymerizing an olefin or a mixture of ethylene and vinyl acetate in a first reaction region, passing the resulting reaction product to a second reaction region into which a second olefin gas stream is fed and polymerized and blending the polymerization product from the second reaction region with a single reactor ethylene-vinyl acetate copolymer. The dual reactor copolymers have a vinyl acetate content up to about 6 percent. The single reactor copolymer contains from 0 to about 70 weight percent vinyl acetate, and has a melt index from about 1 to 5,000. The '852 patent teaches that there is no advantage in the blend having more than ten percent of the single reactor ethylene-vinyl acetate copolymer.

U.S. Pat. No. 3,808,047, issued Apr. 30, 1974 to McAda, discloses a polyethylene blend having improved stress cracking resistance comprising a high molecular weight polyethylene having a melt index from 0.01 to 10 decigrams/minute, and a copolymer of ethylene and an ester comonomer, with the copolymer having a molecular weight below 15,000 and from 20 to 65 weight percent ester comonomer moiety. The blend comprises 85 to 95 weight percent of the high molecular weight percent polyethylene, and from 5 to 15 weight percent of the low molecular weight copolymer. The method for preparing the blend includes introducing the copolymer into the polyethylene in the molten state as it passes from the polymerization zone.

U.S. Pat. No. 4,003,963, issued Jan. 18, 1977 to Creasy et al., discloses barrier packaging compositions that are blends of vinyl chloride polymer containing no carboxyl groups and about 10 to about 30 weight percent of an ethylene/vinyl alcohol copolymer containing greater than 50 mole percent of vinyl alcohol.

U.S. Pat. No. 4,293,473, issued Oct. 6, 1981, discloses solid adhesive compositions consisting essentially of 2–35 weight percent vinyl alcohol polymer, and 10–80 weight percent of at least two component crystalline solvent system.

U.S. Pat. No. 4,312,918, issued Jan. 26, 1982 to Bostwick, discloses compositions of polyethylene and a copolymer of ethylene-alkyl acrylate having improved environmental stress cracking resistance.

U.S. Pat. No. 4,866,122, issued Sep. 12, 1989 to Gerlowski et al., discloses blends of polyketone polymers with polyvinyl alcohol.

U.S. Pat. No. 4,910,253, issued Mar. 20, 1990, and U.S. Pat. No. 4,965,314, issued Oct. 23, 1990, both to Lancaster et al., disclose oxygen barrier resins comprising carbon monoxide-containing ethylene polymers blended with vinyl alcohol polymers, including vinyl alcohol homopolymers and copolymers.

U.S. Pat. No. 5,011,720, issued Apr. 30, 1991 to Jabarin, discloses a blend of a polyolefin, a polymer having a polar group and a barrier polymer, with suitable polymers with a polar group including copolymers of ethylene, propylene, butylene, with monomers containing polar groups, including vinyl acetate, and with suitable barrier polymers including ethylene/vinyl alcohol copolymers.

U.S. Pat. No. 5,175,054, issued Dec. 29, 1992 to Chu, discloses a metallized film combination of an oriented polymeric substrate layer with a coating of a blend of (a) a vinyl alcohol homopolymer or copolymer, and (b) an ionic copolymer of ethylene and an ethylenically unsaturated monocarboxylic acid.

However, in spite of these advancements in the prior art, none of these prior art references disclose or suggest blends of ethylene vinyl alcohol polymers with ethylene based polymers having improved environmental stress cracking resistance or environmental fatigue resistance.

Thus, there is still a need for blends of ethylene vinyl alcohol polymers with ethylene based polymers having improved environmental stress cracking resistance or environmental fatigue resistance.

There is another need in the art for a method of making blends of ethylene vinyl alcohol polymers with ethylene based polymers having improved environmental stress cracking resistance or environmental fatigue resistance.

There is even another need in the art for articles made from such blends of ethylene vinyl alcohol polymers with ethylene based polymers having improved environmental stress cracking resistance or environmental fatigue resistance.

These and other needs in the art will become apparent to those of skill in the art upon review of this specification, including its drawings and claims.

SUMMARY OF THE INVENTION

It is an object of the present invention to provide for blends of ethylene vinyl alcohol polymers with ethylene based polymers having improved environmental stress cracking resistance or environmental fatigue resistance.

It is another object of the present invention to provide for a method of making blends of ethylene vinyl alcohol polymers with ethylene based polymers having improved environmental stress cracking resistance or environmental fatigue resistance.

It is even another object of the present invention to provide for articles made from such blends of ethylene vinyl alcohol polymers with ethylene based polymers having improved environmental stress cracking resistance or environmental fatigue resistance.

These and other objects of the present invention will become apparent to those of skill in the art upon review of this specification, including its drawings and claims.

According to one embodiment of the present invention, there is provided a blend composition, which includes (a) ethylene vinyl alcohol polymer; and (b) a polymer of ethylene with at least one monomer selected from the group consisting of an alpha olefin having at least 2 carbon atoms, and an ethylenically unsaturated carboxylic ester.

According to another embodiment of the present invention, there is provided a method of making a blend. The method includes the step of contacting together (a) ethylene vinyl alcohol polymer, and (b) a polymer of ethylene with at least one selected from the group consisting of alpha olefin having at least 2 carbon atoms, and an ethylenically unsaturated carboxylic ester monomer.

According to even another embodiment of the present invention, there is provided a product having a flexible portion. The flexible portion comprises (a) ethylene vinyl alcohol polymer, and (b) a polymer of ethylene with at least one selected from the group consisting of alpha olefin having at least 2 carbon atoms, and an ethylenically unsaturated carboxylic ester monomer.

According to still another embodiment of the present invention, there is provided a method of making a product. The method first includes heating above its melting point to form a molten mixture, a blend of (i) ethylene vinyl alcohol polymer, and (ii) a polymer of ethylene with at least one selected from the group consisting of alpha olefin having at least 2 carbon atoms, and an ethylenically unsaturated carboxylic ester monomer. The further includes forming the molten mixture into a desired shape. The method finally includes cooling the shape below its melting point.

DETAILED DESCRIPTION OF THE INVENTION

Figure 1:
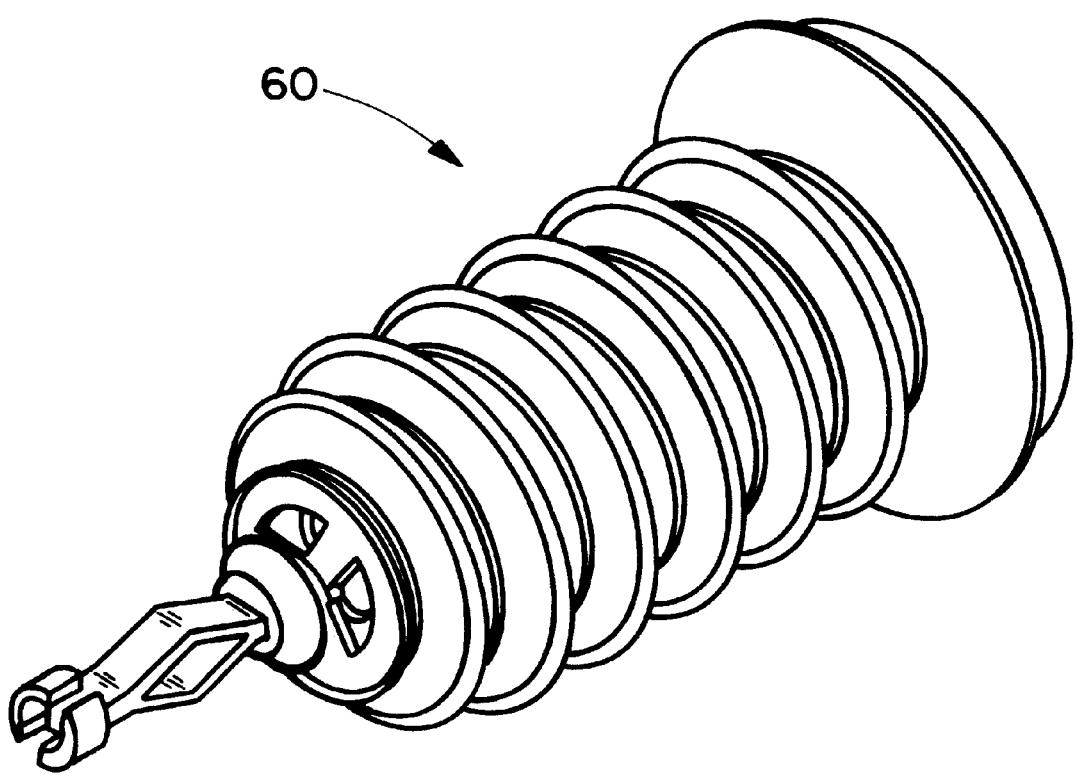
FIG. 1 is an illustration of a sprayer bellows 60 of Example 2.

The polymer blends of the present invention displaying improved environmental stress cracking resistance include an ethylene based polymer and an ethylene vinyl alcohol (EVOH).

The ethylene vinyl alcohol polymers utilized in the present invention must have a molecular weight suitable to provide a suitably enhanced environmental stress cracking resistance or environmental fatigue to the ethylene copolymer. Generally, the melt flow index of the ethylene vinyl alcohol polymer utilized in the present invention will be in the range of about 0.5 to about 20. Preferably, the melt flow index of the ethylene vinyl alcohol polymer utilized will be in the range of about 1 to about 15, more preferably in the range of about 1.2 to about 10.

The ethylene vinyl alcohol polymers utilized in the present invention may comprise any useful mole percentages of ethylene and vinyl alcohol. Generally, the ethylene vinyl alcohol polymers utilized in the present invention will comprise in the range of about 1 to about 75 mole percent ethylene and in the range of about 99 to about 25 mole percent vinyl alcohol, preferably in the range of about 5 to about 50 mole percent ethylene and in the range of about 95 to about 50 mole percent vinyl alcohol, and more preferably in the range of about 20 to about 45 mole percent ethylene and in the range of about 80 to about 55 mole percent vinyl alcohol, all based on the total moles of vinyl alcohol and ethylene.

The ethylene based polymer utilized in the present invention may be an ethylene homopolymer or copolymer.

Suitable polyethylenes will have a melt flow index in the range of about 5 to about 40, preferably in the range of about 8 to about 30. More preferred polyethylenes include linear low density polyethylenes.

Suitable ethylene based polymers may be made from processes utilizing conventional Ziegler-Natta catalysts, or metallocene catalysts.

Suitable ethylene based copolymers utilized in the present invention include copolymers of ethylene with one or more α-olefins having at least 3 carbon atoms. Preferably, the α-olefin utilized in the copolymers of the present invention comprises from about 3 to about 12 carbon atoms, more preferably from about 3 to about 8 carbon atoms, and even more preferably from about 6 to about 8 carbon atoms. Preferable examples of suitable α-olefins includes propylene, butylene, pentene, hexene and octene. Most preferably, the α-olefin utilized in the ethylene copolymer of the present invention is 3-methyl pentene, hexene or octene.

Other suitable ethylene based copolymers useful in the present invention include copolymers of ethylene with ethylenically unsaturated carboxylic ester monomers.

The ethylenically unsaturated carboxylic ester monomers utilized in the copolymers of the present invention are selected from the group of vinyl esters of saturated carboxylic acids and alkyl esters of an α,β-ethylenically unsaturated carboxylic acids. Examples of suitable ester monomers include methyl acrylate, ethyl acrylate, butyl acrylate, isobutyl acrylate, methyl methacrylate, diethyl maleate, dimethyl fumarate, vinyl acetate, vinyl propionate and the like. Preferable ester monomers includes one or more of methyl acrylate, ethyl acrylate and vinyl acetate. The most preferable copolymer is ethylene vinyl acetate.

Suitable copolymers of ethylene and ethylenically unsaturated carboxylic ester monomers will generally have a melt flow index in the range of about 5 to about 40, preferably in the range of about 8 to about 30.

Methods of copolymerizing ethylene and an ethylenically unsaturated carboxylic ester monomer are well known, and any suitable method may be utilized. The typical method utilizes a high pressure free radical reaction where ethylene and liquid comonomer are admixed in the presence of catalyst to create copolymer. Such a reaction may be conducted in a stirred tank reactor as described in U.S. Pat. No. 2,220,429, or conducted in a continuous tubular reactor as described in U.S. Pat. No. 3,988,509, both herein incorporated by reference.

The blends of the present invention will generally include any suitable amounts ethylene based polymer and ethylene vinyl alcohol that will provide a blend having an improved environmental stress cracking resistance or environmental fatigue. The blends of the present invention will generally include in the range of about 50 to about 99 weight percent of ethylene based polymer and in the range of about 50 weight percent to about 1 weight percent ethylene vinyl alcohol (based on the total weight of the ethylene based polymer and ethylene vinyl alcohol). Preferably, the blends of the present invention will include in the range of about 70 to about 95 weight percent of ethylene based polymer and in the range of about 30 weight percent to about 5 weight percent ethylene vinyl alcohol, more preferably in the range of about 75 to about 95 weight percent of ethylene based polymer and in the range of about 25 weight percent to about 5 weight percent ethylene vinyl alcohol, and even more preferably in the range of about 75 to about 90 weight percent of ethylene based polymer and in the range of about 25 weight percent to about 10 weight percent ethylene vinyl alcohol.

The blends of the present invention can be obtained utilizing any suitable blending method and apparatus. Examples of suitable apparatus include Banbury mixers, steam heated two roll mill mixers, screw type extruders, and the like. Any conventional method which provides a homogeneous mixture can be employed. For example, the selected polymers can be fluxed along with any desired additives in a Banbury mixer for a four or five minute cycle, with the material then worked on a two-roll mill before transferring it into the rolls of a calender mill. It is also possible to have the mixing accomplished in a mixing extruder prior to forming the composition. The blends can also be formed in one or more reactors in situ.

The blends of the present invention will find utility in the making of products subject to static or cyclic loading conditions in a harsh chemical environment, for example, bellows, diaphragms, and boots. Such products have a flexible, resilient, spring-like portion, which can be subject to static or cyclic loading. Such a spring-like portion may comprise one or more folds, pleats or the like, to form an accordion-shaped section which functions as a spring, for example as with a bellows.

Products can be made from blends of the present invention utilizing any suitable method. For example, blends of the present invention find use in a broad range of polymer fabrication processes, including, injection molding, stamp molding, extrusion, pultrusion, pressing, blow molding, and the like. Generally, blends of the present invention are heated above the melting point and formed into a desired shape, and cooled to stabilize the blend into the desired shape.

In the blend of the present invention, there may be utilized, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

The blends of the present invention may be further blended with or incorporated into one or more thermoplastics. These one or more thermoplastics can be included during the blending of the ethylene vinyl alcohol and the ethylene based polymer. Non-limiting examples of suitable thermoplastics include other polyolefins, polyesters, polyamides, polycarbonates, polyurethanes, polyacrylonitriles, polyvinyl chlorides, polyvinylidene chlorides, and butadiene styrene containing polymers.

EXAMPLES

The following examples are provided to illustrate the present invention and are not intended to limit the scope of the claims.

Example 1

Making of Blends

Blends of commercially available resins were prepared in a two step process. In the first step, desired portions of resins were dry blended to obtain a dispersion of the selected pelletized resins. Dry blending was performed in a Kelly Duplex mixer sold by Duplex Mill & Manufacturing Company, Springfield Ohio 45501. The resin was blended for 10 to 20 minutes. In the second step, the dry blended resins were feed to the hopper of an extruder for melt blending. The extrusion was performed in a 30 mm Werner Pfleiderer ZSK-30 corotating twin screw extruder, made in Austria, configured with one kneading section. The temperatures in the feeding zone were approximately 160° C., and the temperatures in the plasticating and mixing zones of the barrel were approximately 170° C. The melt temperature measured at the die was about 175° C. The screw speed was about 250 rpm, and the throughput was between 20 and 50 pounds per hour. The end of the extruder was fitted with a two hole die plate which created dual strands of molten plastic. These strands were quenched in 50 to 70° F. water, pelletized and collected for further processing.

A number of blends as listed in Table 1 were made using the process. Ethylene vinyl acetate resins used in the blends were either Ultrathene (UE) obtained from Quantum Chemical Co., Cincinnati Ohio or Elvax (EL) obtained from E.I. DuPont, Wilmingtion Del. Blends made from EVOH polymers containing from 32 to 44 mole percent ethylene (E) obtained from Evalco, Lisle Ill., and from ethylene vinyl acetate polymers containing between 9 and 28 percent vinyl acetate (VA) were evaluated. MQFQ was a 13 MFI ULDPE obtained from Enichem. Melt Flow Indices (MFI) are also provided.

TABLE 1

| No. | Resin 1 | Wt. % | Resin 2 | Wt. % |
|---|---|---|---|---|
| 1 | UE652-059 (19% VA, MFI 30) | 95 | LC-E105A (44% E,) MFI 5.5) | 5 |
| 2 | UE652-059 (19% VA, MFI 30) | 85 | LC-E105A (44% E,) MFI 5.5) | 15 |
| 3 | UE652-059 (19% VA, MFI 30) | 75 | LC-E105A (44% E, MFI 5.5) | 25 |
| 4 | UE652-059 (19% VA, MFI 30) | 95 | LC-F101AZ (32% E, MFI 1.6) | 5 |
| 5 | UE652-059 (19% VA, MFI 30) | 85 | LC-F101AZ (32% E, MFI 1.6) | 15 |
| 6 | UE652-059 (19% VA, MFI 30) | 75 | LC-F101AZ (32% E, MFI 1.6) | 25 |
| 7 | EL250 (28% VA, MFI 25) | 85 | LC-E105A (44% E, MFI 5.5) | 15 |
| 8 | EL250 (28% VA, MFI 25) | 85 | LC-F101AZ (32% E, MFI 1.6) | 15 |
| 9 | Exact 4003 (mPE) | 85 | LC-E105A (44% E, MFI 5.5) | 15 |
| 10 | MQFO (ULDPE) | 85 | LC-E105A (44% E) | 15 |
| 11 | UE652-059 | 100 | | |
| 12 | Elvax 250 | 100 | | |
| 13 | Exact 4003 (mPE) | 100 | | |
| 14 | MQfQ (ULDPE) | 100 | | |

Example 2

Making of Bellows

The bellows 60 illustrated in FIG. 1 (sprayer bellows) was made in a hand-mold for each of the samples of Table 1. The hand-mold lacks temperature control or cooling circuits. Because of manual handling, the cooling time of the part and residence time in the injection molder were variable. The injection molder used for manufacture of this style bellow was an Arburg Allrounder 220-75-250, made in Germany. The melt temperature measured in these runs was between 195 and 225° C. An injection time between 0.2 and 0.6 seconds was used to fill the part. A pressure of about 12,000 psi was used to pack the part and this pressure was held for about 2 seconds. Bellows were removed from the core side of the mold by inflating the bellows with an air pressure of about 25 psi while simultaneously pulling the bellow off the core.

Example 3

Testing of Bellows

The various bellows made as described above were first conditioned at 100° F. for 12 to 16 hours, and then subjected to cycle testing (vertical compression of the bellows with a repetitive stroke of ½" at 2 Hz for 10,000 cycles) in 10% Igepal. Results are provided in the following Table 2.

TABLE 2

| No. | Prep Temp (° F.) | Test Temp (° F.) | EFR DESC | EFR SCORE |
|---|---|---|---|---|
| 1 | 100 | 100 | 3H/1DC | 4.75 |
| 2 | 100 | 100 | 2H/2DC | 4.50 |
| 3 | 100 | 100 | 4LC | 3.00 |
| 4 | 100 | 100 | 4DC | 4.00 |
| 5 | 100 | 100 | 4DC | 4.00 |
| 6 | 100 | 100 | 1DC/3LC | 3.25 |
| 7 | 100 | 100 | 4LC | 3.00 |
| 8 | 100 | 100 | 4NC* | 1.00 |
| 9 | 100 | 100 | 4LC | 3.00 |
| 10 | 100 | 100 | 4H | 5.00 |
| 11 | 100 | 100 | 4LC | 3.00 |
| 12 | 100 | 100 | 4LC | 3.00 |
| 13 | 100 | 100 | 2H/2DC | 4.50 |

H—"HOLE"
DC—"DEEP CRACK"
LC—"LARGE CRACK"
NC—"NO CRACK"

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. A bellows comprising a body having a flexible portion, the flexible portion comprising:
   (a) ethylene vinyl alcohol polymer; and
   (b) an ethylene based polymer of ethylene and at least one monomer selected from the 3-methyl pentene, hexene or octene;
      wherein the flexible portion comprises in the range of about 75 to about 90 weight percent (b), and in the range of about 25 to about 10 weight percent (a), based on the total weight of (a) and (b); and,
      wherein the ethylene vinyl alcohol polymer has a melt flow index in the rage of about 1 to about 15, and the ethylene based copolymer has a melt flow index in the range of about 5 to about 40.

2. A bellows comprising a body having a flexible portion, the flexible portion comprising:
   (a) ethylene vinyl alcohol polymer; and,
   (b) an ethylene based polymer comprising a copolymer of ethylene and an alpha olefin having at least 3 carbon atoms and a copolymer of ethylene and vinyl acetate;
      wherein the flexible portion comprises in the range of about 75 to about 90 weight percent (b), and in the range of about 25 to about 10 weight percent (a), based on the total weight of (a) and (b); and
      wherein the ethylene vinyl alcohol polymer has a melt flow index in the range of about 0.5 to about 20, and the ethylene based polymer has a melt flow index in the range of about 8 to about 30.

* * * * *